US008233668B2

(12) United States Patent
Jing et al.

(10) Patent No.: US 8,233,668 B2
(45) Date of Patent: Jul. 31, 2012

(54) DISTINGUISHING ABUTTING FOOD PRODUCT

(75) Inventors: Hansong Jing, Redmond, WA (US); George R. Blaine, Lake Stevens, WA (US)

(73) Assignee: John Bean Technologies Corporation, Chicago, IL (US)

( * ) Notice: Subject to any disclaimer, the term of this patent is extended or adjusted under 35 U.S.C. 154(b) by 229 days.

(21) Appl. No.: 12/853,195

(22) Filed: Aug. 9, 2010

(65) Prior Publication Data

US 2012/0034349 A1   Feb. 9, 2012

(51) Int. Cl.
 *G06K 9/00* (2006.01)
(52) U.S. Cl. ........................ 382/110; 382/132
(58) Field of Classification Search .................. 382/110, 382/132
 See application file for complete search history.

(56) References Cited

U.S. PATENT DOCUMENTS

| 5,041,907 | A  | 8/1991  | Sager         |
| 5,585,603 | A  | 12/1996 | Vogeley, Jr.  |
| 6,310,964 | B1 | 10/2001 | Mohan         |
| 6,563,904 | B2 | 5/2003  | Wijts         |
| 6,604,991 | B1 | 8/2003  | Jürs          |
| 6,882,740 | B1 | 4/2005  | McDonald, Jr. |
| 7,251,537 | B1 | 7/2007  | Blaine        |
| 7,621,806 | B2 | 11/2009 | Bottemiller   |
| 8,068,656 | B2 * | 11/2011 | Hirose .......................... 382/132 |
| 8,166,856 | B2 * | 5/2012  | Kim et al. .......................... 83/13 |
| 2007/0157776 | A1 | 7/2007 | Sørensen |

FOREIGN PATENT DOCUMENTS

EP  1 718 160 B1  11/2006
WO  2011/025384 A1  3/2011

OTHER PUBLICATIONS

Icelandic Search Report mailed Jan. 25, 2012, issued in corresponding Application No. 8966, filed Jul. 5, 2011, 4 pages.
United Kingdom Search Report mailed Nov. 22, 2011, issued in corresponding Application No. GB1112964.0, filed Jul. 28, 2011, 3 pages.

* cited by examiner

*Primary Examiner* — Tom Y Lu
(74) *Attorney, Agent, or Firm* — Christensen O'Connor Johnson Kindness PLLC

(57) ABSTRACT

A method for determining the boundary between abutting food product in a food processing system uses scan data of the food product to identify a perimeter of the abutting food product. Optionally, data from scanning the food product is first tested to determine or predict if more than one article is present. A perimeter of the abutting food product is generated from the scan data, and the perimeter information is manipulated to identify or estimate the boundary between the product. For example, the boundary may be eroded until it separates into two portions. The two portions are then expanded, constrained by the original perimeter, such that a region of interest includes overlapping portion that includes the boundary. The region of interest is analyzed to locate the boundary. In another method, a parametric shape is fit to the image to identify the individual articles. In another method, a shortest line or surface separating the perimeter into two substantial portions is found.

25 Claims, 13 Drawing Sheets

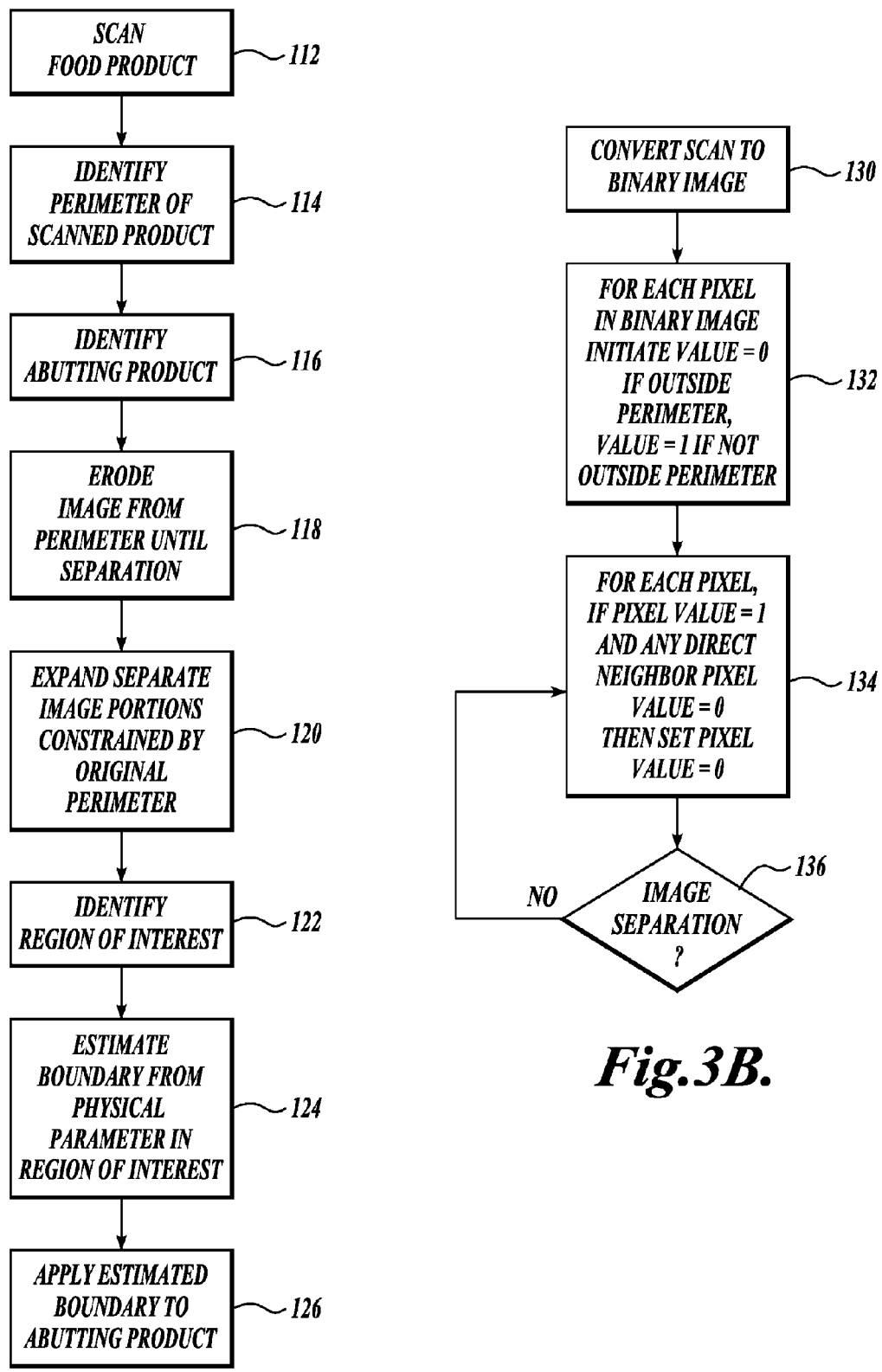

DISTINGUISHING ABUTTING FOOD PRODUCT

BACKGROUND

Often, at least a portion of a food processing system includes the processing of a food product in a continuous process, while the food product is conveyed between two different locations on a conveyor system, for example, a belt conveyor, roller conveyor, wire mesh conveyor, chain conveyor, or the like. It is known in the art that food product may be cut or otherwise divided into smaller portions in such food processing systems. Also, fat, bone, or other unwanted portions may be trimmed from the food products. Prepared food products, such as baked goods, may be frosted, glazed, perforated, portioned, pre-sliced, or otherwise processed. The portioning and trimming of food products is typically accomplished using high-speed portioning machines. See, for example, U.S. Pat. No. 7,621,806, to Bottemiller et al., which is hereby incorporated by reference in its entirety.

Typically, food processing systems may use any of a variety of scanning techniques to identify and characterize food product. For example, a scanning system may be used to identify the location and orientation of a food product on a conveyor system, and may further provide information about the two-dimensional and/or three-dimensional shape of the food product. This information will typically be analyzed with the aid of a computer to determine, for example, how to most efficiently portion the food product into a desired size, weight, or shape according to other criteria. For example, if food product portions of a specific weight are desired, the information from the scanner may be employed to control the operation of a cutting device to cut the food product to achieve a desired portion size. If the food product width and/or height varies, the thickness of the slices may be varied to achieve a desired portion weight, for example, using an estimated density of the food product.

However, automated scanning systems may have difficulties in correctly identifying and characterizing food product when two or more items are abutting each other during the scan. For example, current scanning systems may interpret two (or more) abutting food items as a single item. Moreover, even if the system is able to predict or determine that two (or more) food items are present, current scanners are typically unable to identify a shared boundary between the abutting items.

For several reasons, there is a need to accurately identify and distinguish food product that are touching. For example, often the food product is scanned to determine and optimize further processing such as trimming, cutting, portioning, packaging, and the like. If meat product is incorrectly cut, for example, due to the failure to properly distinguish touching product, the result may be undersized portions, which may be unacceptable to consumers. Also, if the scanning data is used to identify particular features on a food product, for example, the keel on a breast of chicken, and the identified feature is used to plan or optimize further processing, the ability to distinguish touching product may be particularly important. Accurate statistics on the food product, for example, number of product, length, width, and size of the food product, as well as sorting of food product, requires accurately distinguishing touching food product.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for identifying a boundary between two abutting articles is disclosed wherein the abutting articles are scanned to produce a scan data set, which is used to identify a closed contour corresponding to the perimeter of the scanned articles, and the perimeter is analyzed to estimate the location of the boundary between the two articles.

In an embodiment, the contour is analyzed by eroding the contour until the contour separates into two separate portions, and then growing or expanding the two portions, constraining the growth by the original closed contour. An overlapping region adjacent the abutting boundary is then analyzed to estimate the location of the shared boundary, for example by identifying the shortest line segment that connects opposite sides of the overlapping portion.

In a particular embodiment, the scan image is converted to a binary image having a first pixel value if the pixel is outside the closed contour and a second pixel value if the pixel is not outside the closed contour. For each pixel having the second value, the pixel value is set to the first value if any neighboring pixel has the first value. The erosion is continued until the closed contour separates into two closed contours.

In another embodiment, the step of eroding the closed contour includes calculating a local slope of the closed contour at discrete points about the closed contour and, for each of the discrete points, moving the discrete point inwardly by a fixed amount in a direction locally perpendicular to the closed contour. The erosion is continued until the closed contour bifurcates.

In another embodiment, the perimeter is a three-dimensional contour.

In another embodiment, the step of eroding the closed contour includes identifying successive contours corresponding to the perimeter of the scanned pair of food products at increasing elevations until the closed contour separates into two separate closed contours.

In another embodiment, the step of analyzing the closed contour includes selecting an ideal shape characterizing at least a portion of the first and second articles; identifying from the scan data a first portion of the closed contour that matches at least a portion of the selected ideal shape, and fitting the ideal shape to the first portion of the closed curve to define a first ideal model; identifying from the scan data a second portion of the closed contour that matches at least a portion of the selected ideal shape, and fitting the ideal shape to the second portion of the closed curve to define a second ideal model; and calculating the shared boundary location from the first and second ideal models in the region of the shared boundary.

In an embodiment, the step of analyzing the closed contour comprises searching for the shortest line segment that divides the closed contour into two portions, wherein the ratio of the size of the two portions is within a specified range.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is a flow chart of an exemplary method for distinguishing touching food in accordance with the present invention;

FIG. 3B is a flow chart of an exemplary method for eroding an image from a perimeter;

DETAILED DESCRIPTION

Figure 1:
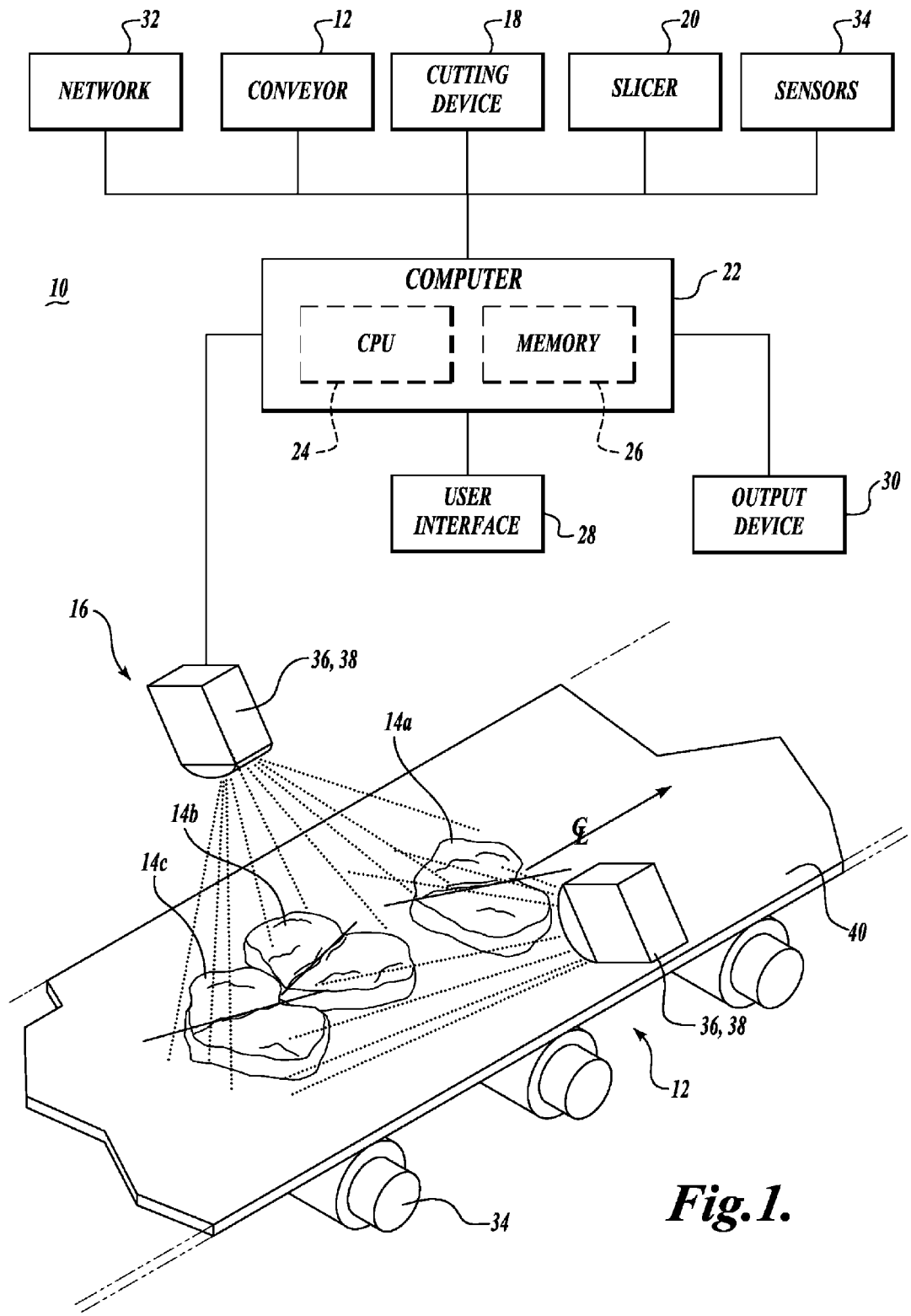
FIG. 1 is a schematic view of a system for distinguishing abutting food product in accordance with the present invention.

FIG. 1 schematically illustrates the system 10 in accordance with the present invention. The system 10 includes a conveyor 12 for carrying work products such as food products (in this example, poultry breasts) 14a, 14b, 14c (collectively referred to as food product 14). The system 10 also includes a scanning system 16 for scanning the food product 14 as the food product passes by on the conveyor 12. Although only one conveyor 12 is illustrated, the system 10 may utilize more than one conveyor, for example, a loading conveyor, a processing conveyor, and an unloading conveyor. Other processing equipment (not shown) may be utilized in the present system, for example, equipment for processing, portioning, manipulating, heating or cooling, or the like. Such equipment may be used for a wide range of processes, including, for example, cooking, steaming, frying, baking, roasting, grilling, boiling, battering, freezing, marinating, rolling, flattening, drying, dehydrating, tenderizing, cutting, portioning, trimming, slicing, deboning, diverting, or off-loading the food product, as are well-known in the art. The conveyor 12, the scanning system 16, and other processing equipment are coupled to, and controlled by, a computer or data processor 22.

Describing the foregoing system in more detail, the computer 22 includes a central processing unit 24 (hereinafter CPU) and a memory unit 26. Data consisting of physical and/or anatomical features of different types of food products can be stored in the computer memory 26. Also, data consisting of desired end-product shapes can also be stored in the computer memory 26. The data stored in the computer memory can be readily selected by the user via user interface 28, for example, when changing product lines. For instance, system 10 may be used for processing chicken breasts for a particular customer. When the order for the customer is filled, the user may switch the mode of the computer to a different food product having different physical/anatomical features. The computer 22 also includes an output device 30 usable to display or print data, information, or images related to the processing of the food product.

As shown in FIG. 1, the computer 22 can be in communication with a network system 32 which allows the computer to talk to and share information with other computers. As noted above, computer 22 can also drive other peripheral hardware besides the scanning system 16. For example, computer 22 can direct the operation of the conveyor 12, cutting device 18, slicer 20, as well as other processing apparatus that may be utilized. Further, the computer 22 can receive information from various sensors, including encoder 34 to guide or direct a multitude of systems.

The conveyor 12 carries the food product 14 beneath the scanning system 16. The scanning system 16 may be of a variety of types. For example, the scanning system may comprise one or more imaging components 36 (two shown), such as video cameras, and one or more irradiating components 38, such as light sources positioned to illuminate the food product 14 as it passes under the imaging component 36. In one embodiment, the light source projects a transverse beam or sheet that extends across the moving conveyor belt 40 to define a sharp and narrow line of illumination (or shadow). When no food product 14 intersects the light beam, the bright line forms a straight line across the conveyor belt 40. However, when a food product 14 passes through the transverse beam, the upper, irregular surface of the food product produces an irregularly shaped line of light as viewed by the imaging component 36 (in this case a video camera) directed diagonally downwardly on the food product 14. The video camera detects the displacement of the line from the position it would occupy if no food product were present on the conveyor belt 40. This displacement represents the thickness of the food product along the light stripe. Moreover, the length of the food product may be determined by the distance of the belt travel while the illumination line is displaced by the food product. In this regard, encoder 34 is integrated into the infeed conveyor 12, with the encoder generating pulses at fixed distance intervals corresponding to the forward movement of the conveyor.

In lieu of a video camera, the scanning station irradiating component 38 may instead comprise, for example, an x-ray apparatus for determining the physical characteristics of the food product 14, including its shape, mass, and weight. The irradiating x-rays may be passed through the object in the direction of an x-ray detector (not shown). Such x-rays are attenuated by the food product in proportion to the mass thereof. The scanner system 16 in this embodiment includes the x-ray irradiating component 38 to irradiate the food product 14 and an imaging component 36 comprising a receiver 38 to receive the attenuated radiation. The receiver portion 38 can be integral with the generator 36.

Attenuation of the x-rays can occur by passing through the food product or by reflection from the food product. When radiation passes through the food product, a certain amount of radiation is absorbed by the food product through which it passes, therefore there will be a relationship in the amount between the radiation sent to the food product and the radiation received after it has passed through the food product. The cause of absorption is believed to reside in the chemical bonds within the molecules of the food product. Radiation once attenuated can be collected and converted into a useable form. Photodiodes, for example, may be used to convert an amount of radiation in the visible range into a voltage or current signal. For x-rays, a scintillating material may be used to generate visible light capable of detection by a photodiode. This method is described in U.S. Pat. No. 5,585,603, to Vogeley, Jr., which is incorporated herein by reference.

Although the foregoing description discusses scanning by use of an imaging component 36, for example, a video camera or x-ray detector, and an irradiating component 38, for example, a light source or an x-ray source, other two-dimensional or three-dimensional scanning techniques may be utilized. For example, volumetric scans may be obtained using light in various frequencies, ultrasound, and the like. Surface information relating to shape and height may be obtained from the reflectivity from the surface of the food product, including the reflective color. The reflectivity of the scanned food product may be used in combination with other imaging modalities to characterize the food product. Examples of additional techniques may include ultrasound or moiré fringe methods. In addition, electromagnetic imaging techniques may be employed. Thus, the present invention is not limited to use of video or x-ray methods, but encompasses other three-dimensional scanning technologies.

The data and information measured/gathered by the scanning device(s) is transmitted to the computer 22, which records the location of the food product 14 on the conveyor 12, both transversely and longitudinally relative to the conveyor 12, as well as the length, width and thickness of the food product 14 about the entire area of the food product. With this information, the processor can develop an area map, an area profile, as well as a volume profile or three-dimensional surface map of the food product. Knowing the density of the food product, the processor can also determine the weight of the food product or segments thereof. For example, the system 10 may include an inline weighing device (not shown) as are known in the art.

The scan information can also be used to ascertain whether there are any defects in the food product. Such defects might include tears, holes, fat, bone, or cartilage. For example, if an x-ray apparatus is utilized, if a hole or tear exists, the x-rays will be attenuated to a lesser extent than if the food product was structurally intact. Also, for food products composed of raw meat, the density of fat, bones, and cartilage is different from the density of the meat. This density variation results in a difference in the attenuation of the x-rays passing through the food product. For example, the density of bone is greater than the density of the meat. Thus, the x-rays passing through the bone will be attenuated to a greater extent than the x-rays passing through the meat. As a consequence, by the scanning process, the existence as well as the position and size of the defects in the food product may be ascertained. Examples of the foregoing scanning devices are disclosed in U.S. Pat. No. 6,563,904, incorporated by reference herein.

It will be appreciated that a challenge for automated scanning systems, such as the system 10 discussed above, is in discriminating between individual food products that are touching or abutting each other such as food products 14b and 14c in FIG. 1. The abutting contact may include slight overlapping of adjacent products. Optimizing subsequent processing of the food products 14b and 14c will be improved by accurately distinguishing between food product 14b and food product 14c. For example, if the food products 14b, 14c are to be trimmed, portioned, or the like, then an accurate identification or estimation of the abutting boundary between the two pieces will be helpful.

Figure 2:
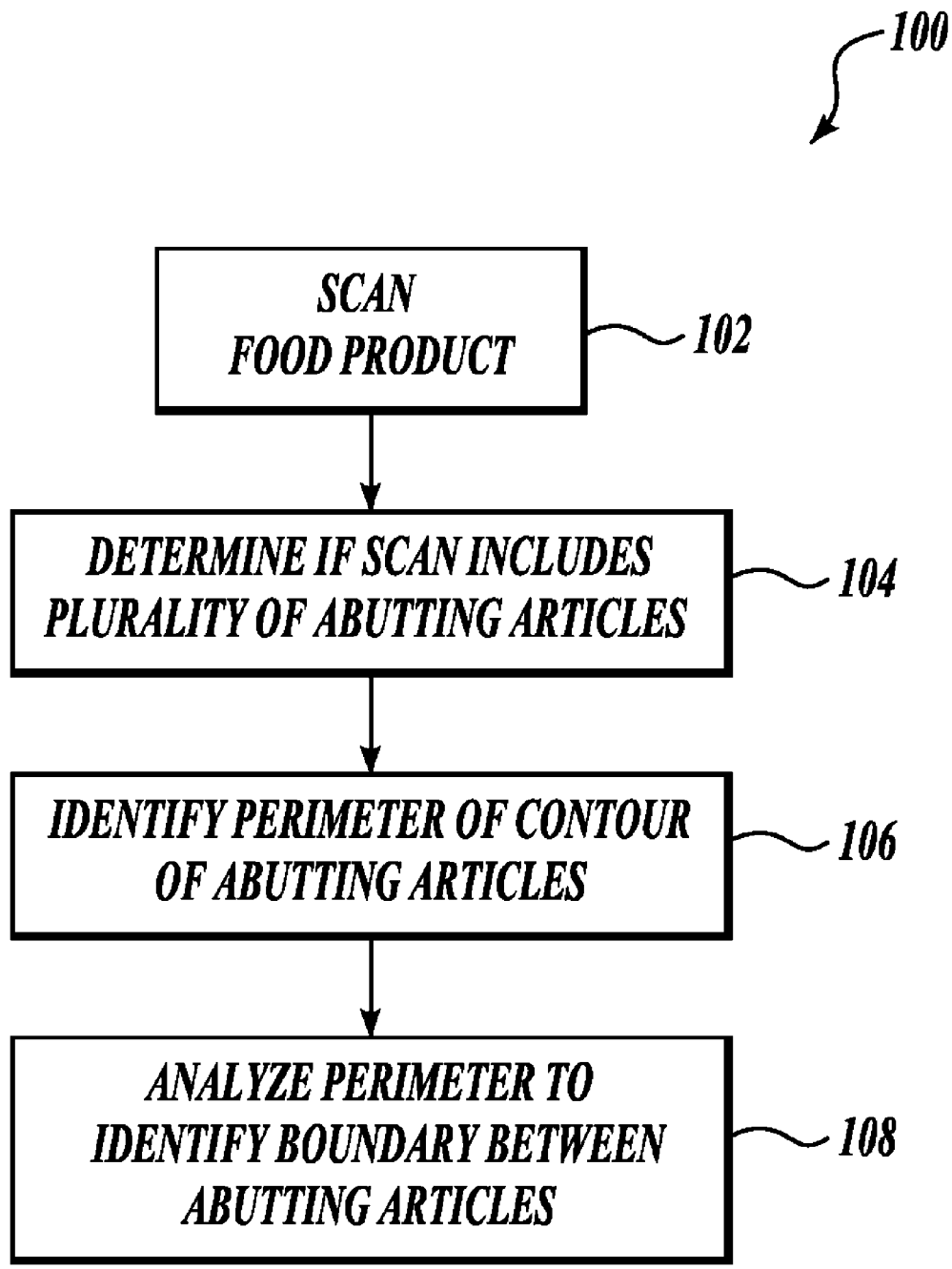
FIG. 2 illustrates a method in accordance with the present invention for identifying a shared boundary between two abutting articles of food product from scan data.

Refer now also to FIG. 2, which illustrates a method 100 for identifying a shared boundary between two abutting articles of food product from scan data. Using a system, for example, system 10, food product 14 on a conveyor are scanned 102. As discussed above, a conventional scanner may readily identify physically separated articles of food, for example, by projecting a narrow beam of light on the conveyor belt which produces a straight line when no article of food intersects the beam. However, when two articles of food are touching or abutting, the scan cannot readily distinguish the abutting articles and the scan data may include more than one article.

Optionally, the system 10 may first determine if the scanned food product includes more than one article 104, for example, by weighing the food product, measuring a physical parameter such as length, width, area, or the like, or analyzing the shape of the food product. For example, a vector of various attributes, such as length, color, surface reflectivity, weight, area and/or volume may be used to predict that multiple articles 104 are represented in the scan data. Alternatively, each set of scan data may be analyzed to identify or estimate a shared boundary between abutting articles, and the results of the analysis may be used to determine if abutting articles are present. In either case, the outer perimeter or contour of the abutting articles is identified 106. The closed contour representing the outer perimeter is then analyzed to determine or estimate the location that defines the boundary between the abutting articles 108.

It will be appreciated that although in the current embodiment the closed contour represents the entire perimeter of the abutting articles, in some situations it may be beneficial or more efficient to crop the outer perimeter prior to analyzing the data, for example by only scanning a relevant portion of the articles. For purposes of this application, the closed contour representing the outer perimeter is defined to include such a cropped closed contour. In an exemplary embodiment, a closed outer perimeter may be defined by scanning a portion of the articles, and defining the closed perimeter by the boundary of the portion of the region scanned, or by closing the perimeter with a line perpendicular to the direction of belt travel. Alternatively, the closed perimeter may be defined by closing a contour for a partially scanned item by fitting a standard or idealized shape to produce a hybrid perimeter comprising a scanned portion and a modeled portion.

A particular embodiment of a family of methods in accordance with the present invention will now be described with reference to FIGS. 3A and 3B. In this embodiment, the food product is scanned 112, for example, with scanning system 16 to produce scan information that represents the scanned food product 14b, 14c, and the scan information is forwarded to the computer/processor 22. The computer 22 may analyze the scan data to characterize the scanned food product, for example, to identify its position, physical parameters, and other physical attributes. The scan data is analyzed to generate a perimeter of the scanned food product 114. Typically, the perimeter comprises a simple closed curve or volume. It will be appreciated that the perimeter data may not be printed or otherwise displayed, but may be merely stored in electronic form in computer memory 26.

The system identifies when the scan data includes abutting food product 116. For example, the computer 22 may use the scan data to calculate a length, width, area, volume, or other physical attribute of the scanned food product, and an abutting plurality of food product may be surmised if the calculated value or combination of values exceeds a predetermined threshold. In another embodiment, a characteristic of the particular food product may be used to identify when abutting product are present. For example, if a generally cylindrical food product is being processed, then a relatively elongate scanned image may indicate a plurality of abutting product. Alternatively or additionally, other means may be used to identify when abutting product are present. For example, a scale may be provided that estimates the weight of the food product.

If abutting food product is present in the scan data, the perimeter data is eroded until the eroded perimeter separates into two distinct portions 118. Different methods for eroding the perimeter data are discussed below. In one embodiment, if the perimeter data does not separate into two distinct portions after a predetermined number of erosion steps, for example, then the system may conclude that the scan data does not represent two abutting articles.

After the eroded perimeter separates into two distinct portions, an inverse of the erosion step is conducted, wherein the separate portions are expanded or grown 120, but the growth of the separate portions are constrained by the original perimeter. The separate portions are expanded until the original perimeter is recovered. It will be appreciated that the shared boundary between the abutting articles of food is not constrained because the original perimeter does not identify this boundary (e.g., see FIG. 4A). Therefore, as the separate portions are each expanded, the unconstrained regions corresponding to the shared boundary between the articles of food will overlap. This overlapping region is identified as a region of interest 122, and a physical parameter from this region of interest is used to estimate the contour and position of the boundary between the two articles of food 124. The estimated shared boundary is then applied to the abutting product 126.

A representative method for eroding the perimeter is shown in FIG. 3B. In this exemplary method, the scan data is converted to a binary image 130 comprising a large number of pixels, wherein a pixel value of one, for example, indicates a pixel that is outside the perimeter and a pixel value of zero indicates a pixel that is not outside the perimeter 132. Then, for each pixel, IF the pixel value=1 AND any direct neighbor pixel has a pixel value=0, THEN set the pixel value=0. This step is repeated until image separation is achieved 136.

Although in this exemplary embodiment the scan data is converted to a binary image, it will be apparent to persons of skill in the art that it is not necessary to work with a binary image. For example, it is contemplated that analog values in the image may be used, and a threshold value may be selected to distinguish pixels inside the perimeter from pixels outside the perimeter. In this case, values other than 1 and 0 may be used to indicate pixels inside, and outside, the current boundary. It is also contemplated that the erosion step may be equivalently accomplished by expanding or dilating the background.

Figure 4A:
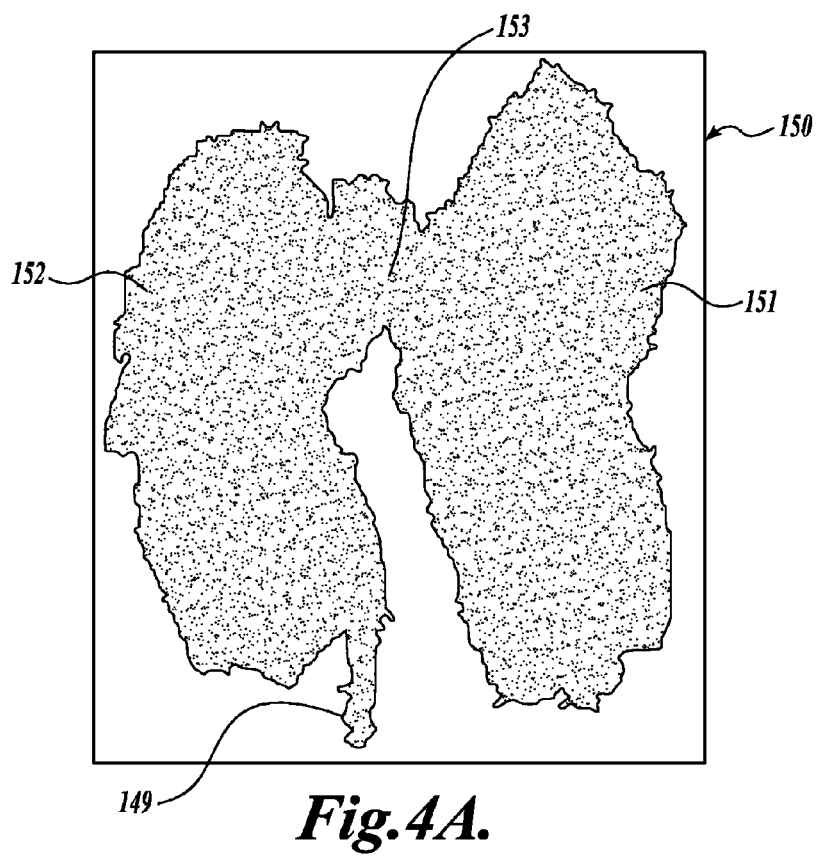
FIGS. 4A-4F illustrate the progression of the method of FIG. 3A.

In some applications, the food product may include narrow peripheral projecting portions that may comprise skin, sinew, fat, or the like (see projection 149 in FIG. 4A). Therefore, it will sometimes be desirable to include a test upon separation wherein the erosion process is concluded only if the two separate portions that are formed at separation are comparable in size, to within a predetermined range. If one of the separate portions is significantly smaller than the other, the eroding process continues. For example, the test for stopping the eroding procedure may be when separation is achieved 136 and the area of the smaller separate portion is at least 50% (or some other predetermined percentage) of the area of the larger separate portion.

After separation, the erosion method may be applied in reverse to expand the separate portions until the original perimeter is filled, wherein the expansion at each point is constrained by the original perimeter, and the two portions are expanded independently from each other.

Figure 4B:
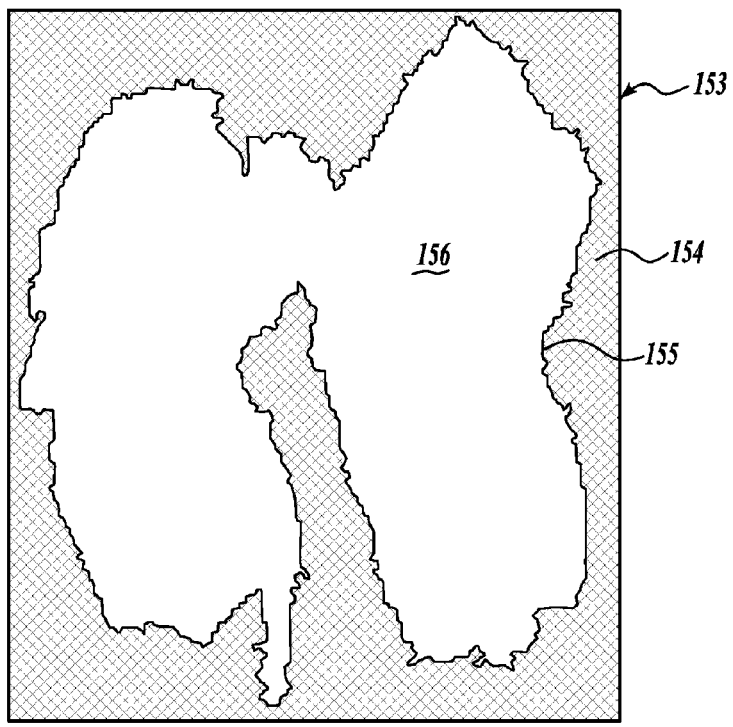

An application of this method will now be described with reference to FIGS. 4A-4F. FIG. 4A illustrates a scanned image 150 of two chicken breasts 151, 152 that are abutting along a portion 153. In FIG. 4B the image is converted to a binary image 153, wherein pixels 154 outside the perimeter 155 are assigned a first value (e.g., zero, indicated by cross hatching), and pixels 156 not outside the perimeter 155 are assigned a second value (e.g., one).

Figure 4C:
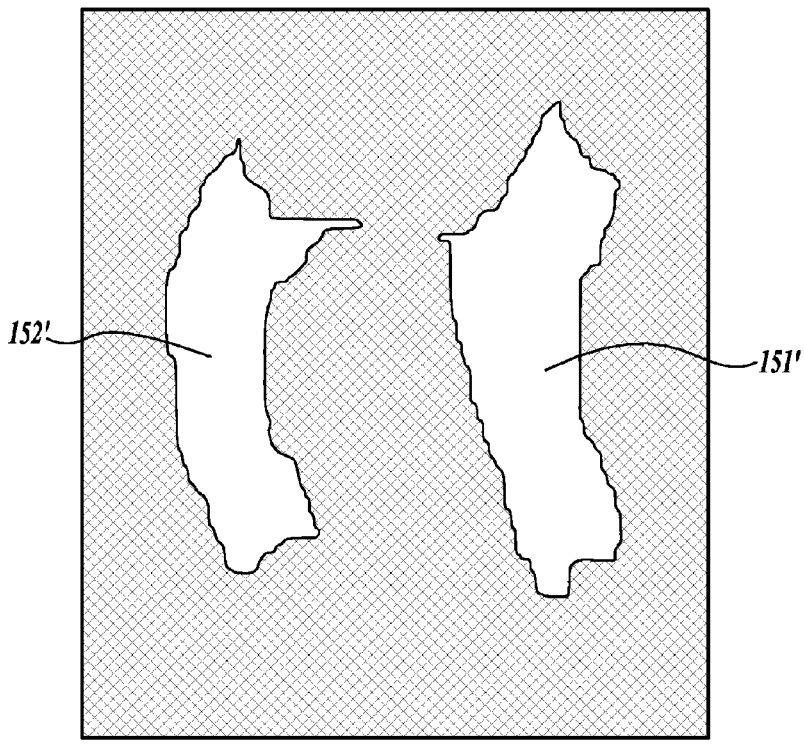

FIG. 4C illustrates the eroded perimeters using the method described above, just after separation, the image comprising a first portion 151' and a separate second portion 152'. Feature detection algorithms for identifying when separation occurs are well known in the art. In the embodiment discussed above wherein the scan data is converted to a binary image, it is particularly straightforward to detect when separation occurs such that there are two distinct portions present. In a current method referred to as blob detection or blobbing, the image pixels are labeled and grouped based on their brightness and connectivity. If more than one object is labeled/detected in an image which originally contained only one object, then separation has occurred. Methods for feature detection in more complex imaging are also known, including, for example, level set methods and fast marching methods which are suited to tracking evolving boundaries.

Figure 4D:
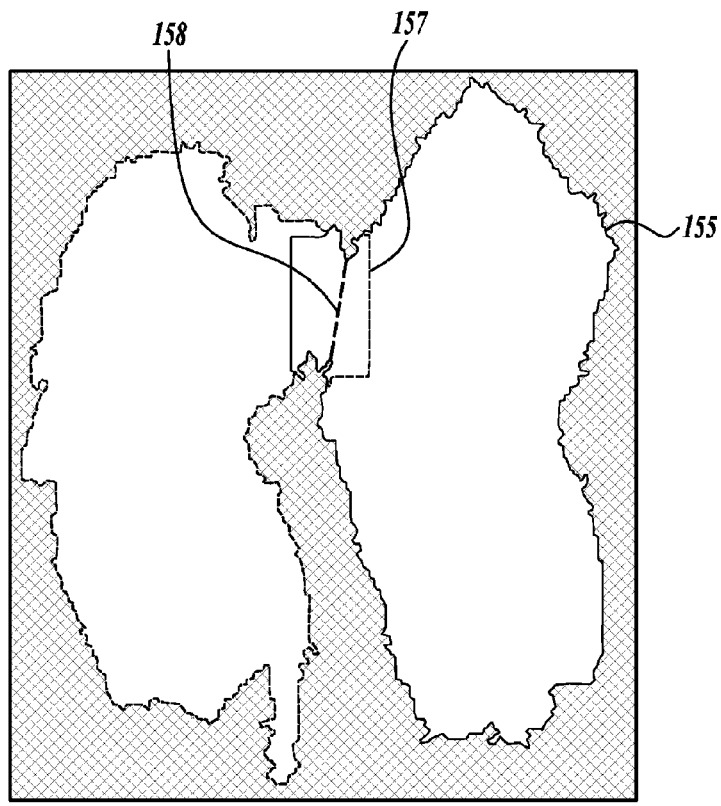
Figure 4E:
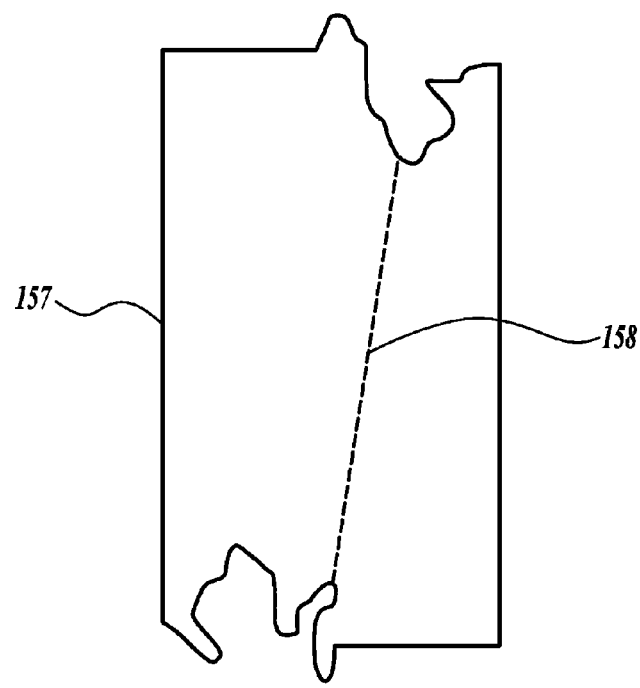
Figure 4F:
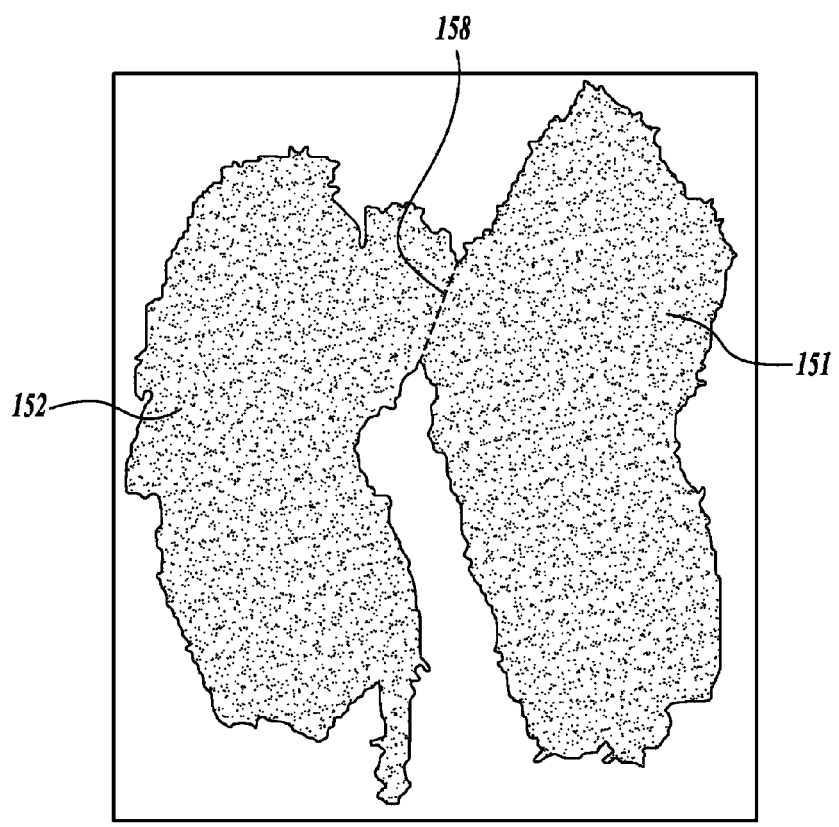

FIG. 4D illustrates the expansion of the first and second eroded portions 151', 152' wherein the expansion has been constrained by the original perimeter 155. However, the first and second portions 151', 152' were expanded independently, and therefore the expanded portions overlap in a region of interest 157 indicated by the dashed box. This region of interest 157 is shown in isolation in FIG. 4E. The region of interest 157 is analyzed for a physical property to estimate the shared boundary 158 between the abutting food articles. In a current embodiment, the shortest line extending across the region of interest 158 provides a good estimate of the shared boundary 158. In FIG. 4F the estimated boundary 158 is applied to locate the boundary between the abutting articles of food product.

In practice, the method may be implemented on product that is moving along a conveyor belt or the like, as discussed above. The conveyor speed may vary significantly, for example, due to upstream or downstream processing constraints, shift changes, or the like. It will be appreciated by persons of skill in the art that the motion of the product may produce elongation of the scan image, or pixel "stretching." It is contemplated that the pixel-based erosion methods disclosed herein may be modified in straightforward manners to accommodate such image elongation, for example, part-time pixel-skipping in the direction of travel, or some other means for producing a dynamic template for erosion.

In some applications, the food articles may include features wherein the erosion method discussed above might predictably produce an erroneous separation. For example, it will be appreciated by persons of skill in the art that the keel portion of the poultry breast is a relatively thin region of the product, and it is not uncommon for poultry breasts to become torn or otherwise partially separated along the keel during processing (the keel of a poultry breast is described in more detail below). A tear along the keel may cause the erosion method described above to separate an image at the keel, rather than at a boundary between abutting articles. However, because the keel may be readily identified, the method may be modified in a straightforward manner to ignore separations that result from erosion along the keel.

It will be appreciated that in the method for erosion and constrained expansion described above, the constrained expansion may require a relatively large number of iterations to produce an overlapping region of interest. For example, if two articles are connected by a long and narrow piece, such as a flap of skin or connective tissue, the erosion step may proceed efficiently because the erosion occurs along the long dimension of the connection. The constrained expansion, however, will proceed in a lengthwise direction (i.e., along the shorter dimension) and may therefore require a relatively large number of steps to produce an overlapping region of interest. It is contemplated that the method described above may be modified to improve efficiency by halting the constrained expansion after a particular threshold has been achieved, for example a given number of iterations or a predetermined fraction of the original perimeter being recovered. If, after achieving the threshold, the image still comprises two separate portions, a simple closed contour, for example a box, may be constructed around each separate portion. The boxes may then be translated to corresponding positions over the food articles, and a parameter such as a line bisecting the distance between the boxes may be used to estimate the boundary between the food articles.

It will be apparent to persons of ordinary skill in the art that other methods for eroding the perimeter from the scan data may alternatively be used. For example, the pixel-based erosion method discussed above may be applied in three dimensions, wherein a three-dimensional scan of the abutting food product is represented by binary voxels. The scan data may provide the three-dimensional perimeter surface of the scanned food product, and the three-dimensional surface may be eroded inwardly until a separation is achieved. The separate portions may then be expanded, constrained by the original perimeter, and an overlapping volume of interest can be analyzed substantially as discussed above. For example, the least area plane dividing the region of interest may provide a best estimate for the location of the shared boundary. Alternatively, a physical attribute such as a valley, crease, or minimum local height may be selected to estimate the shared boundary between the abutting articles.

Figure 5:
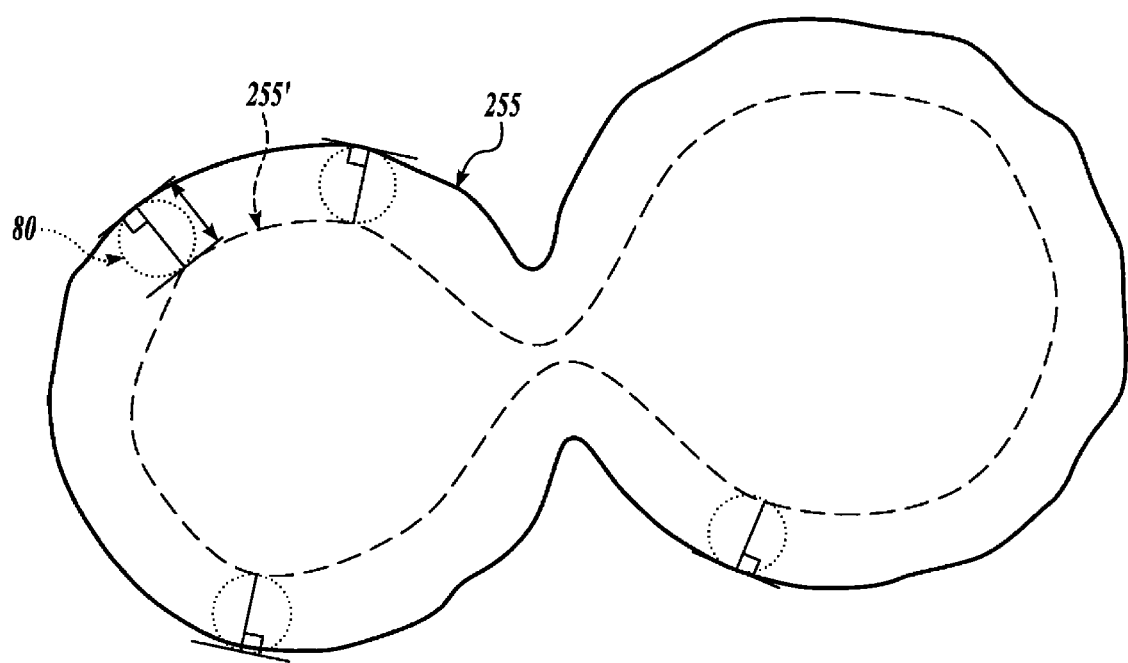
FIG. 5 illustrates conceptually an alternative method for eroding an image from a perimeter image.

In another embodiment, the erosion may be accomplished by discretizing the two- or three-dimensional perimeter of the abutting food product, and moving each discrete point inwardly perpendicular to the line or surface at that point. Each point on the perimeter is moved inwardly by a predetermined amount, and the process is repeated until separation is achieved. The eroded portions are then expanded, constrained by the original perimeter, and the overlapping region of interest is analyzed to determine the location of the shared boundary between the abutting articles. FIG. 5 illustrates conceptually how this method of erosion progresses. A perimeter 255 from scan data of two generally circular abutting product are shown prior to a first step of erosion. Conceptually one could imagine rolling a small ball 80 about the interior of the perimeter 255 and tracing the points corresponding to the opposite side of the ball 80, i.e., across the diameter d of the ball 80 taken from the point of contact with the perimeter 255 or the local tangent, as the ball rolls along the perimeter 255. The result is an eroded perimeter 255'. As discussed above, the erosion step is repeated until separation occurs.

Figure 6:
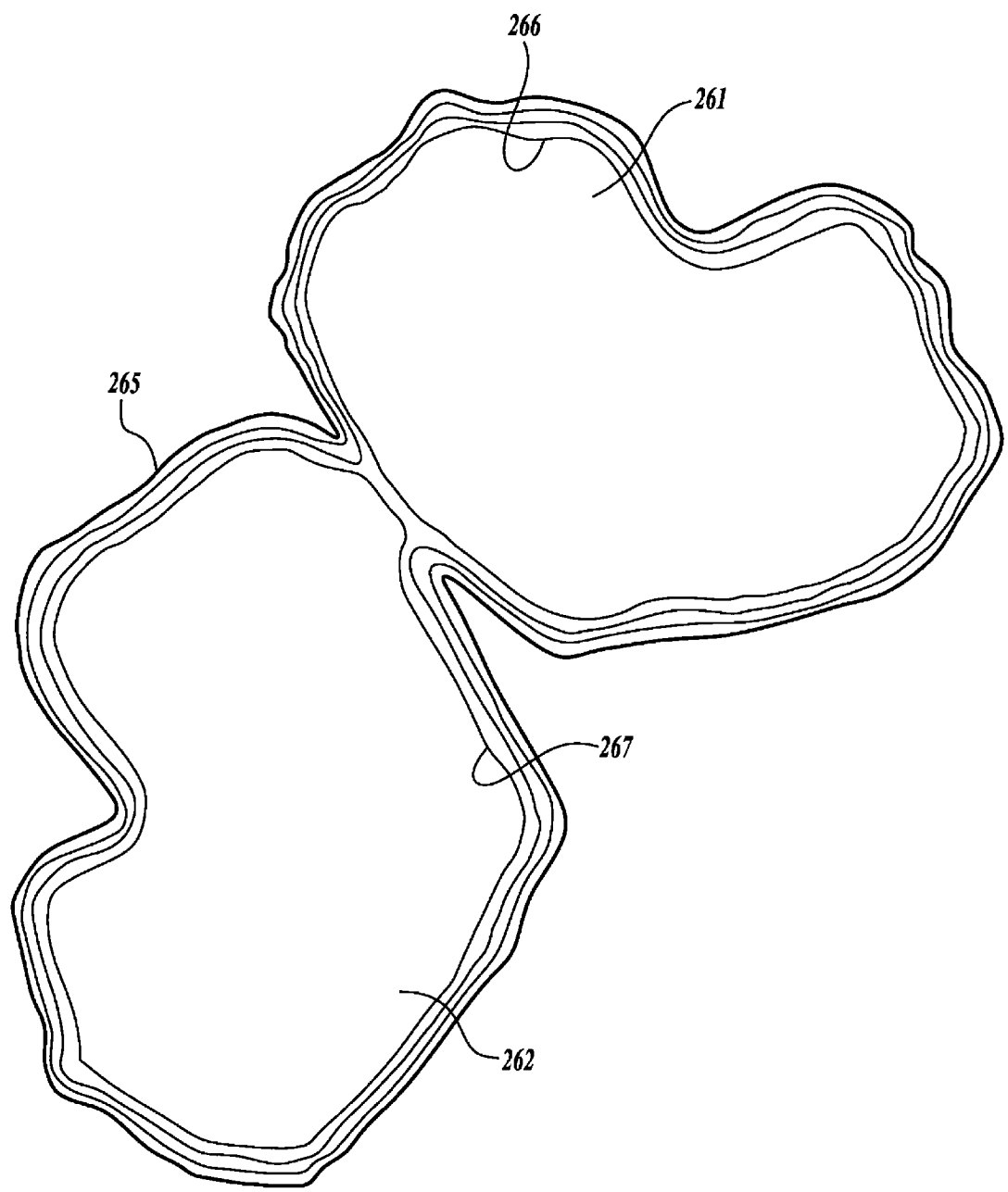
FIG. 6 illustrates another alternative method for eroding an image from a perimeter.

In another embodiment, particularly suitable for food product having a generally mound-like shape, two-dimensional scans of the food product are taken along horizontal planes at increasing elevations, e.g., typically along a plane parallel to the conveyor belt 40. Scanning a food product at a selected elevation is described in U.S. Pat. No. 7,621,806, which is incorporated by reference above. A generally mound-shaped food product has a middle portion that extends higher than the perimeter region, as is typically the case, for example, with poultry breasts. For example, FIG. 6 illustrates a succession of scanned perimeters of two abutting poultry breasts 261, 262 with the scan plane incrementally moved upwardly. Perimeter 265 illustrates an outermost perimeter which encloses both breasts. As the scan plane is moved upwardly, the resulting perimeter from each scan will typically erode or move inwardly with respect to the lower scanning plane. At some elevation the scan image produces two separated closed curves 266, 267 that correspond to the perimeters of the food product articles at the scanned elevation. These perimeters may then be analyzed, for example, by expanding the separate closed curves, or identifying a feature of the two closed curves near the point of separation (e.g., parallel line sections) to identify a shared boundary between the abutting food product.

In another embodiment, identification of a shared boundary between articles of food product that are touching may be accomplished using prior knowledge of an expected feature that is present in the food articles, such as the shape of the food articles or a feature such as a particular anatomical feature. For example, as discussed below with reference to FIGS. 7 and 8, if the food product has a known or expected shape, then the shape can be used to facilitate identifying the boundary between abutting product. Similarly, as discussed below with reference to FIGS. 9A, 9B and 10, if the food product has an inherent physical feature, such as the keel of a poultry breast, approximate symmetry, or a bone structure in a particular meat product, for example, then that information can be used to facilitate identifying the boundary between abutting product.

Figure 7:
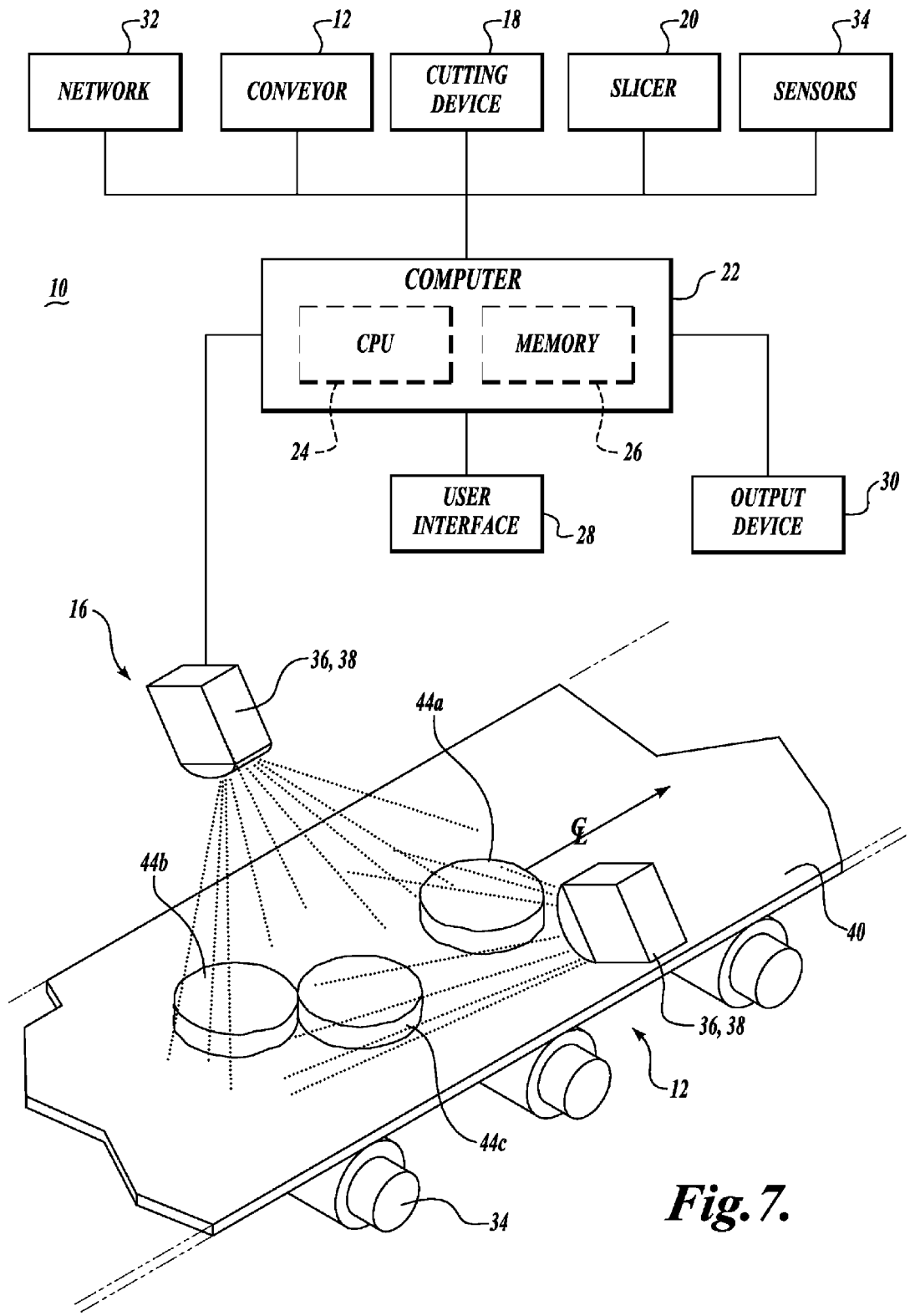
FIG. 7 is a schematic view of the system shown in FIG. 1, with different food product having a characteristic shape.

Refer now to FIG. 7, which is similar to FIG. 1, except the food product being scanned comprises generally cylindrical product, for example, baked goods 44*a*, 44*b*, 44*c* such as cakes, pies, or the like. Description of the individual components will not be repeated here. It will be appreciated that the goods 44*a*, 44*b*, 44*c* may not be perfectly round and may vary somewhat in diameter. Moreover, the baked goods may be very compressible and may include an irregular and flowable outer layer such as a frosting. For example, such product may be transported on a conveyor system 12 to be carried to a cutting apparatus (not shown) that cuts or perforates the food product into wedge-shaped portions.

A conventional scanning system may easily identify a single food article 44*a*, for example, from its generally circular profile when viewed from above. The size and position of the single food article 44*a* may be easily determined to facilitate down stream processing. However, if two or more of the food articles 44*b*, 44*c* are abutting, then a conventional scanning system may be confused by the relatively elongate and irregular shape of the abutting articles 44*b*, 44*c*. Moreover, due to the compressibility and other physical properties of the articles 44*b*, 44*c*, the articles may share an abutting boundary that is relatively long.

Figure 8:
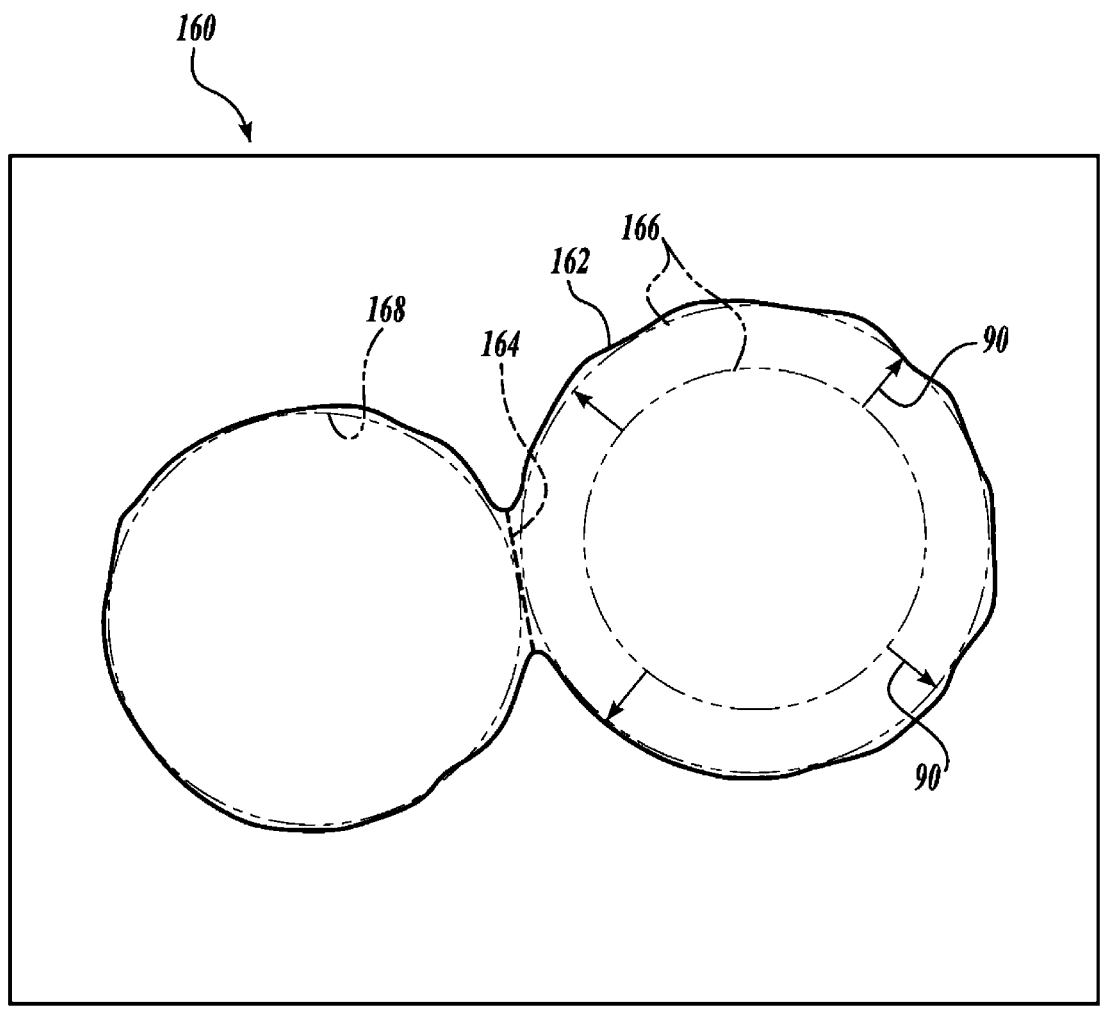
FIG. 8 illustrates a scan image of two abutting articles of food product, wherein the food product have a characteristic shape.

Referring now also to FIG. 8, in this embodiment the scanning system 16 produces scan data that may be used to produce an image 160 with a perimeter 162 of the abutting food articles 44*b*, 44*c*. A physical attribute of the food articles 44*b*, 44*c*, in this case an idealized shape of the plan view (circular), is used to locate the shared boundary 164 between the two food articles 44*b*, 44*c*. First, the idealized shape 166 is sized and positioned to match a portion of the perimeter 162, as indicated by arrows 90. Any suitable optimizing method may be used for locating and sizing the idealized shape 166, for example, a least squares fit. A second idealized shape 168 is similarly sized and positioned on another portion of the perimeter 162 to substantially fill the perimeter 162. It will be appreciated that the two sized and positioned idealized shapes 166, 168 may overlap, touch, or remain spaced apart in the region containing the shared boundary 164 between the two food articles 44*b*, 44*c*. This region of interest may then be analyzed to estimate the position of the shared boundary 164. For example, the shared boundary 164 may be defined as the curve minimizing the square of the distance between the two sized and positioned idealized shapes 166, 168 in the region of interest. Alternatively, circular arcs may be defined that most closely correspond to the idealized shapes, wherein the arcs touch at a single point.

Although the idealized shapes discussed above with reference to the baked goods are geometrically very simple, it will be appreciated that many food articles that are processed have a relatively predictable shape. The shape of the food product may result from the anatomical nature of the food product. For example, chicken breasts typically have a generally consistent shape that is amenable to representation using an idealized model.

Figure 9A:
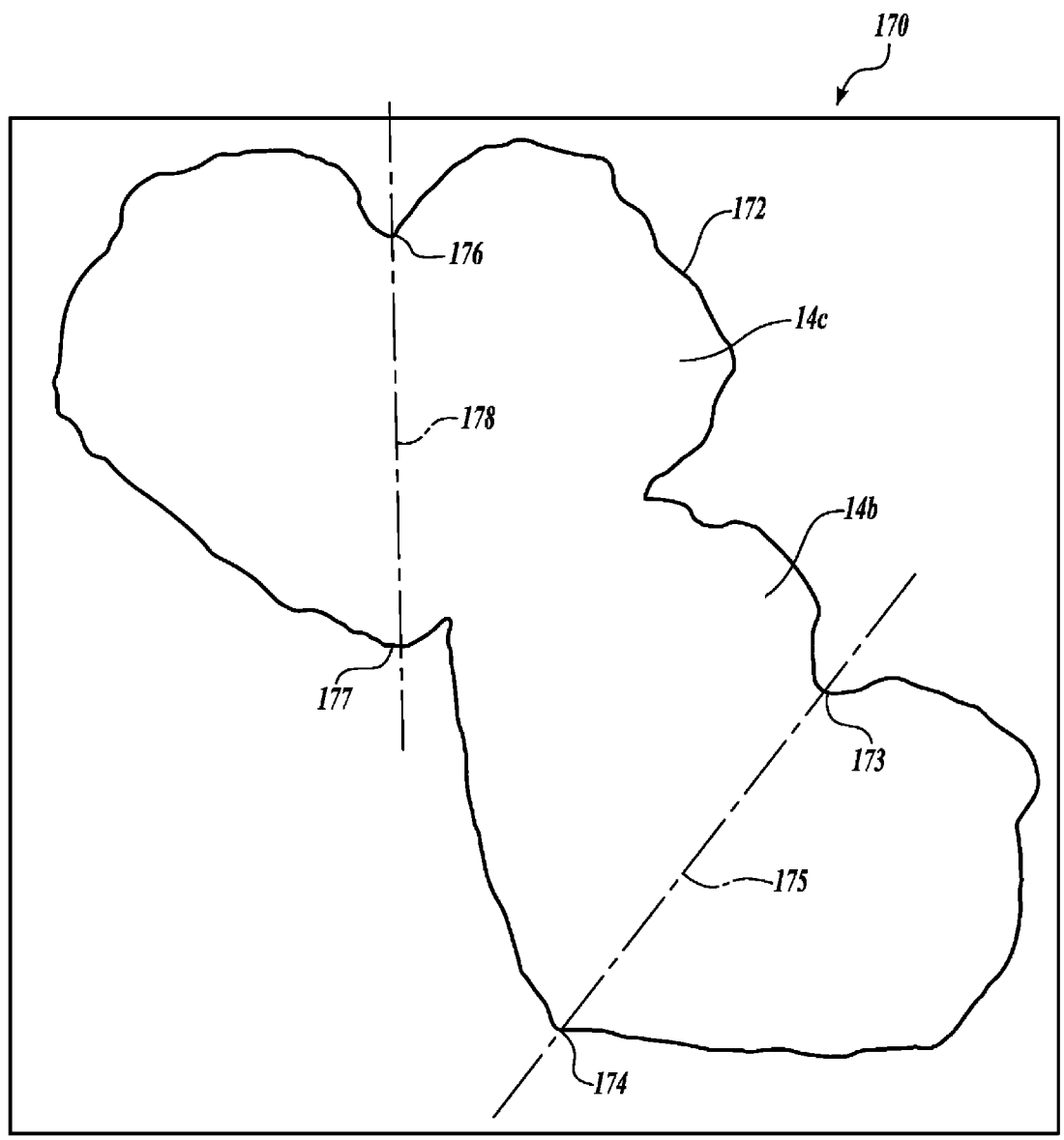
FIGS. 9A and 9B illustrate a folding technique applied to perimeter information obtained from scan data.
Figure 9B:
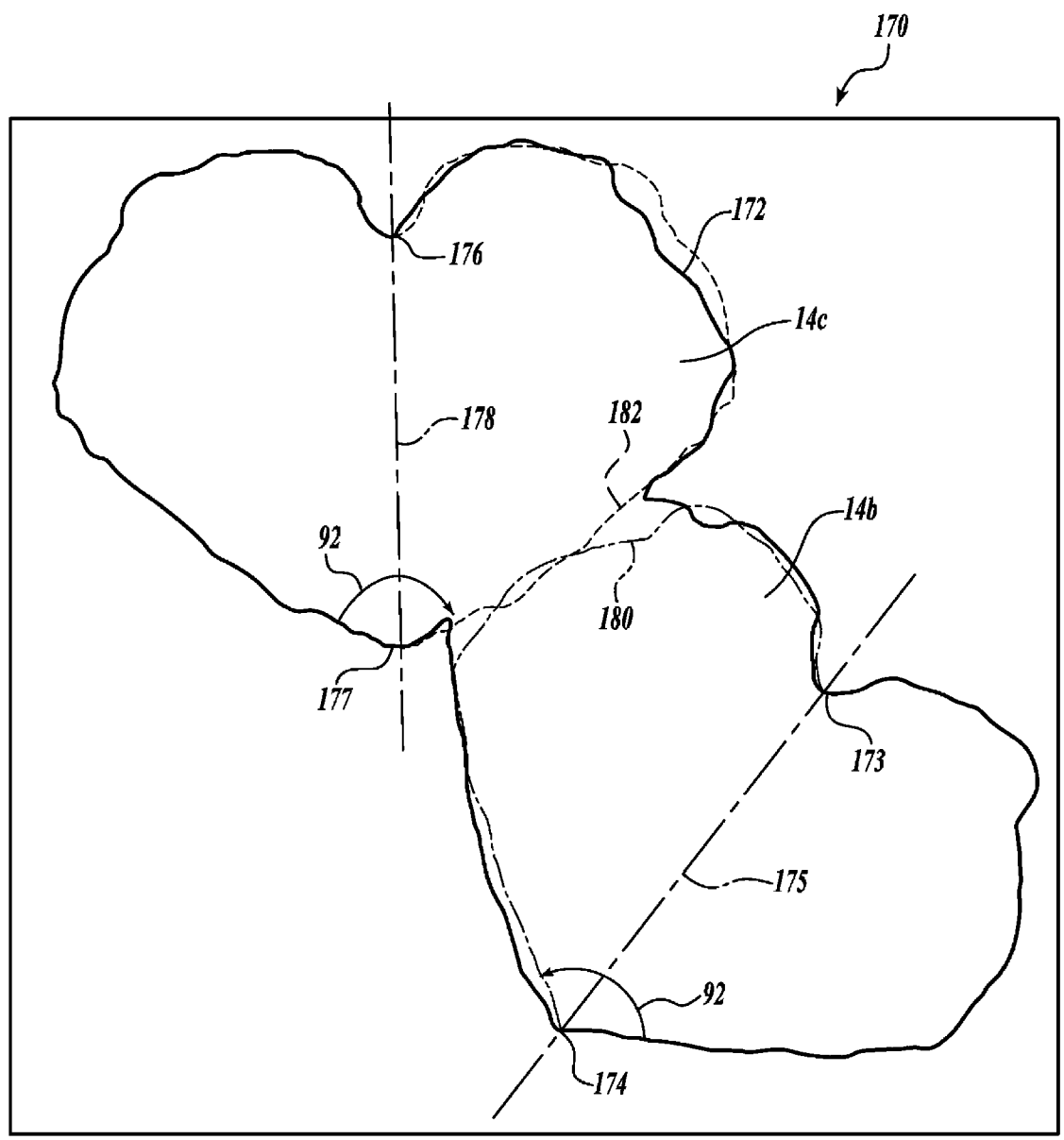

In another example illustrated in FIGS. 9A and 9B, an image 170 illustrating the perimeter of abutting food product (e.g., the chicken breasts 14b, 14c as illustrated in FIG. 1) is generated from data from the scanning system 16.

The scanning data may be used to locate a physical feature or attribute in the food product. For example, food products may include cutouts, notches, or other similar physical features in the interior or at the perimeter of the food product that is indicative of a physical attribute of the food product that can be used to determine the angular orientation of the food product. For fish, meat, or poultry food products, these physical features may consist of, or be related to, anatomical characteristics. For example, poultry breasts are often processed in a butterfly configuration wherein the breast is approximately symmetrical about a center cartilage portion referred to as the keel. The keel may be identified by an indent or notch at one end (where the neck was removed) and an oppositely disposed protrusion. Therefore, the keel may typically be identified in the scan data.

In FIG. 9A the image shows the perimeter 172 of two abutting poultry breasts 14b, 14c (FIG. 1). By identifying the notch 173 and the tip of the protrusion 174 on the first breast 14b, the location of the first keel 175 is located. Similarly, by identifying the notch 176 and the tip of the protrusion 177 on the second breast 14c the second keel 178 may be located. As noted above, poultry keels 175, 178 define an approximate line of symmetry for the associated breasts 14b, 14c. Therefore, the perimeter 172 may be manipulated in software to "fold over" the perimeter at the lines identifying the keels 175, 178, as indicated in FIG. 9B by arrows 92. The first folded over portion of the perimeter is indicated by the broken line labeled 180, and the second folded over portion of the perimeter is indicated by the broken line labeled 182.

Because the symmetry of the poultry breasts 14b, 14c is not perfect, the broken lines 180, 182 may overlap, may be separated by a gap, or may just touch. However, in any case, the location of the shared boundary between the poultry breasts 14b, 14c may be determined by analyzing the portion of the lines 180, 182 in the region of interest inside the perimeter 172. For example, a line bifurcating the two lines 180, 182 may be constructed to identify the shared boundary.

Figure 10:
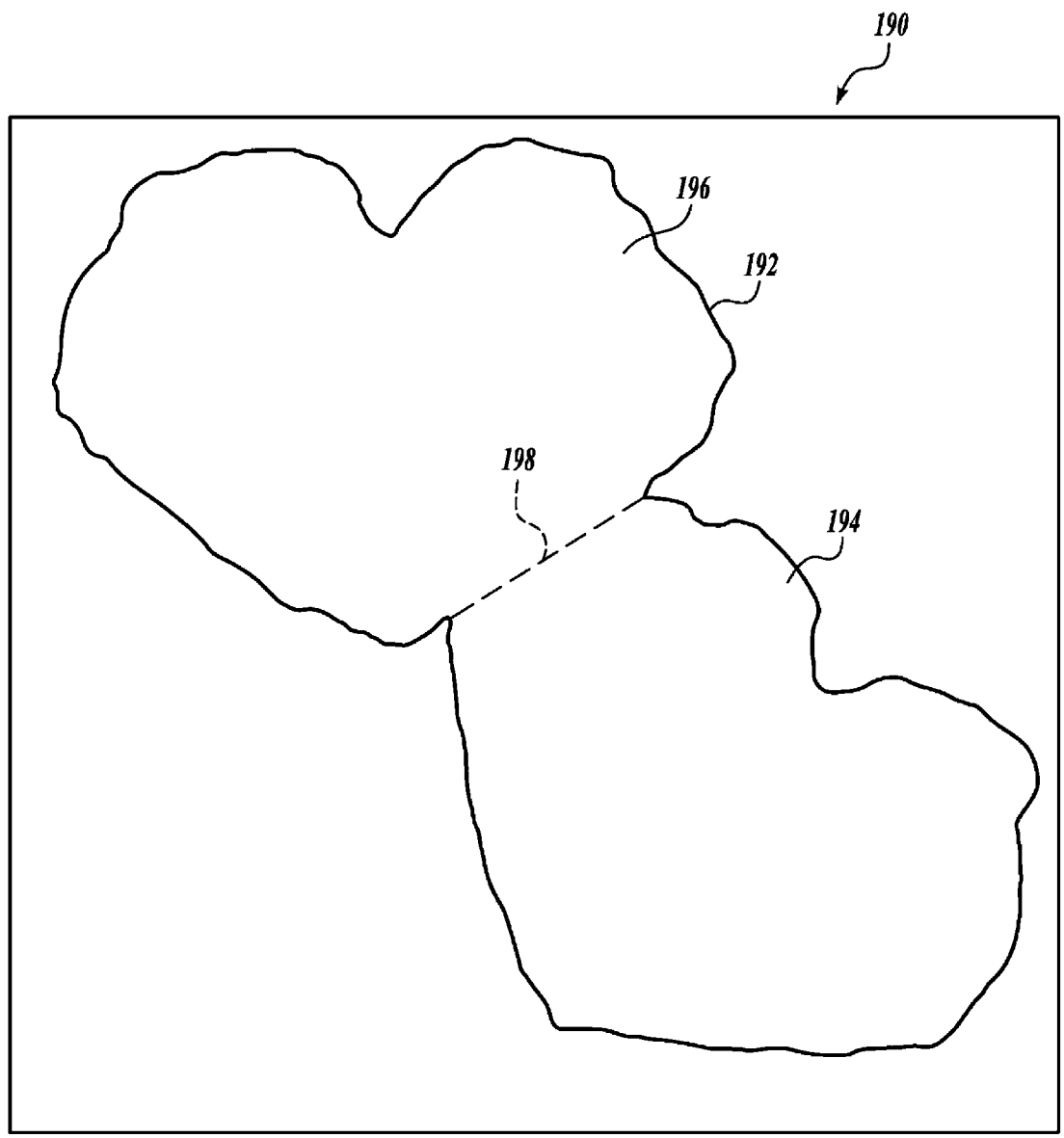
FIG. 10 illustrates a shortest line segment method applied to a scan image of two abutting articles of food product.

In another example illustrated in FIG. 10, the system 10 (FIG. 1) uses the scan data to generate an image 190 illustrating the perimeter 192 of abutting food product (e.g., the chicken breasts 14b, 14c as illustrated in FIG. 1). The perimeter 192 is analyzed by marching around the perimeter in discrete steps and calculating the distance from each discrete point on the perimeter 192 to other discrete points on the perimeter 192, wherein the line segment connecting the discrete points divides the area enclosed by the perimeter 192 into two portions satisfying a minimum area relationship. In this embodiment, the shared boundary between the abutting food product is selected to be the shortest line segment 198 (or smallest area, in the three-dimensional case) that separates the perimeter or closed contour 192 into two portions 194, 196 in which each of the two portions have at least a predetermined fraction of the area of the entire perimeter 192. Equivalently, the boundary between the abutting food product is the shortest line segment 198 that divides the closed contour 192 into two portions wherein the ratio of the area (or volume) of the two portions is within a predetermined range. For example, a candidate border may be the shortest line segment 198 wherein the enclosed area on one side of the line 198 is at least 80% of the enclosed area on the opposite side of the line 198. It will be appreciated that only points that satisfy the second test would need to be tested.

Although the invention has been described in relation to work product in the nature of food, it is contemplated that the disclosed methods may be applied to other work product such as fabrics, glass panels, castings, etc.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for automatically identifying a shared boundary between two abutting food product articles in a food processing system, the method comprising the steps:
   i. scanning a pair of food articles comprising a first food article abutting a second food article, wherein a shared boundary is defined between the first and second food articles to produce a scan data set;
   ii. identifying from the scan data set a closed contour corresponding to a perimeter of the scanned pair of food articles, wherein the closed contour encloses the first and second food articles;
   iii. analyzing the closed contour to estimate the location of the shared boundary between the first and second food articles.

2. The method of claim 1, wherein the scanning is accomplished with at least one of a video camera, an x-ray scanning system, and an ultrasound scanning system.

3. The method of claim 1, wherein the step of analyzing the closed contour comprises:
   eroding the closed contour from the outer perimeter until the closed contour separates into two separate closed contours;
   growing the two separate contours from the outer perimeter, wherein the two separate contours are constrained by the closed contour identified from the scan data set until the two separate contours define an overlapping region of interest that extends across the shared boundary; and
   analyzing the region of interest to determine the location of the shared boundary.

4. The method of claim 3, wherein the step of analyzing the overlapping portion comprises finding the shortest line segment that connects opposite sides of the overlapping portion.

5. The method of claim 3, wherein the step of a eroding the closed contour comprises:
   converting the scan image to a binary image having a plurality of pixels, wherein each pixel has a first value if the pixel is outside the closed contour and a second value if the pixel is not outside the closed contour;
   for each pixel in the binary image having the second value, setting the pixel value to the first value if any neighboring pixel has the first value; and
   repeating the step of setting the pixel value to the first value if any neighboring pixel has the first value until the closed contour separates into two closed contours.

6. The method of claim 3, wherein the step of eroding the closed contour comprises:
   at discrete points about the closed contour, calculating a local slope of the closed contour;

for each of the discrete points, moving the discrete point inwardly by a fixed amount in a direction locally perpendicular to the closed contour; and repeating the step of moving the discrete point inwardly until the closed contour bifurcates.

7. The method of claim 3, wherein the closed contour is a three-dimensional contour, and wherein the step of eroding the closed contour comprises eroding the closed contour in three dimensions.

8. The method of claim 3, wherein the step of eroding the closed contour comprises identifying successive contours corresponding to the perimeter of the scanned pair of food products at increasing elevations until the closed contour separates into two separate closed contours.

9. The method of claim 1, wherein the step of analyzing the closed contour comprises:

selecting a minimum size for the first and second food articles;

identifying the shortest line segment that extends across the closed contour and that divides the closed contour into two portions, wherein each of the two portions is at least as large as the selected minimum size.

10. The method of claim 1, wherein the step of analyzing the closed contour comprises:

selecting an ideal shape characterizing at least a portion of the first and second food products;

identifying from the scan data a first portion of the closed contour that matches at least a portion of the selected ideal shape, and fitting the ideal shape to the first portion of the closed curve to define a first ideal model;

identifying from the scan data a second portion of the closed contour that matches at least a portion of the selected ideal shape, and fitting the ideal shape to the second portion of the closed curve to define a second ideal model; and calculating the shared boundary location from the first and second ideal models in the region of the shared boundary.

11. The method of claim 10, wherein the location of the shared boundary is calculated from the midpoint between the first and second ideal models in the region of the shared boundary.

12. The method of claim 1, comprising the steps of searching for the shortest line segment that divides the closed contour into two portions, wherein the ratio of the size of the two portions is within a specified range.

13. The method of claim 1, wherein the step of scanning a pair of food articles further comprises scanning a third food article, wherein the third food article abuts at least one of the first and second food articles.

14. A method for discriminating between abutting food product disposed on a conveyor comprising:

i. scanning food product disposed on a conveyor as the food product passes by a scanning system;

ii. predicting when a scanned food product comprises a plurality of articles, wherein the plurality of articles are touching such that at least one shared boundary is formed between the plurality of articles;

iii. if a scanned food product is predicted to comprise a plurality of articles, then:

(a) generating a closed contour corresponding to a perimeter of the plurality of articles; and (b) analyzing the closed contour to locate the shared boundary between the plurality of articles.

15. The method of claim 14, wherein the step of predicting when a scanned food product comprises a plurality of touching articles comprises determining at least one physical attribute of the scanned food product and, if the determined at least one attribute exceeds a predefined value, then predicting that a plurality of touching articles are scanned.

16. The method of claim 15, wherein the physical attribute of the scanned food product comprises at least one of the length, width, area, volume, and weight of the scanned food product.

17. The method of claim 15, wherein the scanning is accomplished with at least one of a video camera, an x-ray scanning system, and an ultrasound scanning system.

18. The method of claim 14, wherein the step of analyzing the closed contour comprises:

eroding the closed contour from the outer perimeter until the closed contour separates into two separate closed contours;

expanding the two separate closed contours, wherein the two separate contours are constrained by the generated closed contour, until the two separate contours define an overlapping region of interest; and analyzing the region of interest to estimate the location of the shared boundary.

19. The method of claim 18, wherein the step of analyzing the overlapping region of interest comprises finding the shortest line segment that connects opposite sides of the overlapping region of interest.

20. The method of claim 18, wherein the step of eroding the closed contour comprises:

converting the closed contour to a binary image having a plurality of pixels, wherein each pixel has a first value if the pixel is outside of the closed contour and a second value if the pixel is not outside the closed contour;

for each pixel in the binary image having the second value, setting the pixel value to the first value if any neighboring pixel has the first value; and repeating the step of setting the pixel value to the first value if any neighboring pixel has the first value until the closed contour separates into two separate closed contours.

21. The method of claim 18, wherein the step of eroding the closed contour comprises:

at discrete points about the closed contour, calculating a local slope of the closed contour;

for each of the discrete points, moving the discrete point inwardly by a fixed amount in a direction locally perpendicular to the closed contour; and repeating the step of moving the discrete point inwardly until the closed contour bifurcates.

22. The method of claim 18, wherein the closed contour is a three-dimensional contour, and wherein the step of eroding the closed contour comprises eroding the closed contour in three dimensions.

23. The method of claim 18, wherein the step of eroding the closed contour comprises identifying successive contours corresponding to the perimeter of the scanned pair of food products at increasing elevations until the closed contour separates into two separate closed contours.

24. The method of claim 14, wherein the step of analyzing the closed contour comprises:

selecting a minimum size for the first and second food articles;

identifying the shortest line segment that extends across the closed contour and that divides the closed contour into two portions, wherein each of the two portions is at least as large as the selected minimum size.

25. The method of claim 14, wherein the step of analyzing the closed contour comprises:

selecting an ideal shape characterizing at least a portion of the first and second food products;

identifying from the scan data a first portion of the closed contour that matches at least a portion of the selected ideal shape, and fitting the ideal shape to the first portion of the closed curve to define a first ideal model;

identifying from the scan data a second portion of the closed contour that matches at least a portion of the selected ideal shape, and fitting the ideal shape to the second portion of the closed curve to define a second ideal model; and calculating the shared boundary location from the first and second ideal models in the region of the shared boundary.

* * * * *